US005254377A

United States Patent [19]

Lingemann

[11] Patent Number: 5,254,377

[45] Date of Patent: Oct. 19, 1993

[54] LAMINATED MULTILAYER INSULATING GLASS AND A SPACER FOR THE LAMINATED MULTILAYER INSULATING GLASS

[75] Inventor: Horst Lingemann, Wuppertal, Fed. Rep. of Germany

[73] Assignee: Helmut Lingemann GmbH & Co., Fed. Rep. of Germany

[21] Appl. No.: 750,813

[22] Filed: Aug. 27, 1991

Related U.S. Application Data

[63] Continuation of Ser. No. 413,164, Sep. 27, 1989, Pat. No. 5,087,489.

[30] Foreign Application Priority Data

Sep. 27, 1988 [DE] Fed. Rep. of Germany ....... 8812216

[51] Int. Cl.[5] ......................... B29D 22/00; E06B 3/24

[52] U.S. Cl. ..................................... 428/34.1; 428/34; 428/35.7; 428/35.8; 428/36.9; 428/188; 52/788; 52/790

[58] Field of Search ........................ 428/34, 34.1, 36.9, 428/188, 192, 35.7, 35.8; 156/107, 109; 52/171, 172, 788-790; 232/1 R

*Primary Examiner*—Donald J. Loney
*Attorney, Agent, or Firm*—Jones & Askew

[57] ABSTRACT

A multilayer insulating glass having at least two panes of glass and a resistance heating element on a glass surface. The panes are separated by a spacer comprising two parallel hollow sections and an insulating web of unfoamed and cured polyurethane casting compound filling the interspace between the hollow sections. The web forms a hard and permanent bond with the hollow sections, creating a spacer having relatively high torsional rigidity and electrical insulation and having relatively low thermal conductivity.

10 Claims, 1 Drawing Sheet

LAMINATED MULTILAYER INSULATING GLASS AND A SPACER FOR THE LAMINATED MULTILAYER INSULATING GLASS

This is a continuation, of application Ser. No. 07/413,164, filed Sep. 27, 1989 now U.S. Pat. No. 5,087,489.

BACKGROUND OF THE INVENTION

This invention concerns heatable laminated multilayer insulating glass, also known as safety glass, which consists of at least two panes of glass held together at a distance with a spacer between them and with a gas-filled or evacuated interspace.

With such a multilayer glass, thin delicate electric conductors designed as resistance heating elements with the proper connections for passing an electric current through them are applied to the inner surface of one of the two panes of glass. Then the pane of glass is heated when an electric current is applied to these conductors, it absorbs heat and should release this heat to the air in the room of a building as a result of convection and/or radiation. In designing such a laminated multilayer insulating glass, the spacer must assure special properties. It must not only store the dessiccant as usual and assure access to the interior atmosphere in the interspace for the desiccant but must also have a sufficient rigidity, especially torsional strength, so the laminated multilayer glass can be handled but it must also provide adequate electrical insulation and insulation against the passage of heat.

Spacers made of aluminum, steel and plastic are known. Plastics are known to assure the best electric and thermal insulation. However, plastic does not have adequate strength or torsional rigidity and it also becomes brittle, especially due to the influence of changing temperatures and UV radiation, and it softens on exposure to high temperatures. Steel has sufficient strength but it has a relatively high electric conductivity and a high thermal conductivity. However, aluminum is the least suitable by its nature, although aluminum spacers have proven excellent for normal laminated multilayer insulating gas—i.e., unheatable glass—with regard to its shapability and strength. The thermal conductivity and electric conductivity of aluminum are incomparably higher than those of other materials (thermal conduction of aluminum/steel/plastics=200:52:0.22).

There are heatable laminated insulating glasses and plastic spacers. The disadvantages described here are simply accepted. This heatable laminated insulating glass cannot be expected to retain the required long-term properties.

Furthermore, a heatable laminated insulating glass with a spacer made of metal is also known, in which case a thick cushioning element made of a rubbery elastic substance is provided between the side surfaces of the spacer and the panes of glass. The function of this rubber elastic cushion is primarily that of sound insulation and secondarily it should also provide electric and thermal insulation. However, it has been found that although the sound insulation effect is good, the thermal insulation is inadequate and even the electric insulation is not optimum.

The purpose of the present invention is to create a heatable laminated insulating glass that can be handled very well and assures not only excellent strength and torsional rigidity in the case of spacers made of metal, but also assures extremely low thermal conductivity and an equally low electric conductivity.

On the basis of the figures, this invention is explained in greater detail in the following description as an example. The figures show the following.

DETAILED DESCRIPTION OF THE PREFERRED EMBODIMENTS

Figure 1:
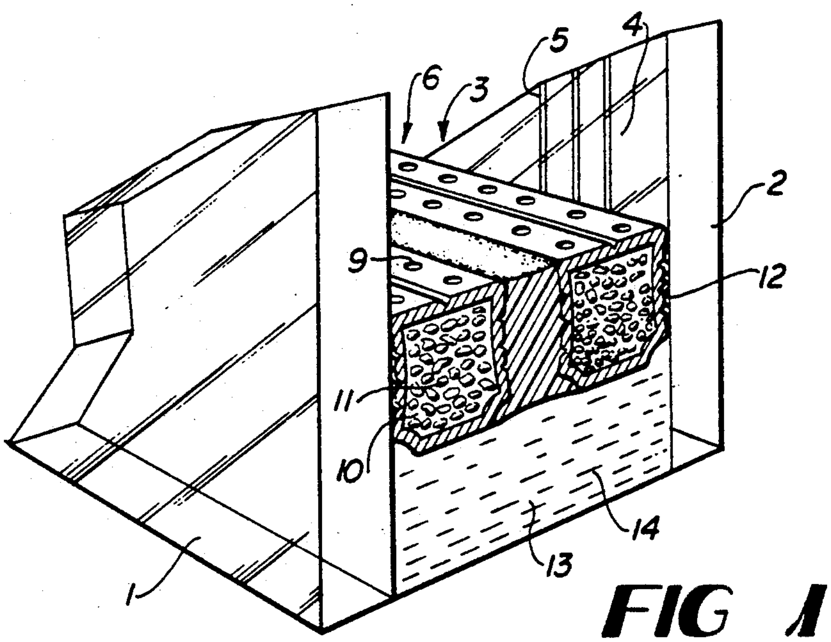
FIG. 1 shows a perspective and schematic view of a detail from the design of a heatable laminated multilayer insulating glass.

The heatable laminated multilayer insulating glass is placed in a frame of a window or door (not shown). It consists essentially of the two parallel panes of glass 1 and 2 arranged side by side with a distance between them forming an interspace 3 between them. Conducting paths 5 of a resistance heating element (not shown) are applied, e.g., by vapor deposition to the inner surface 4 of one pane of glass 2. The electric terminals and the entire design of the resistance heating element need not be described because they are part of the state of the art and are not critical for the purposes of this invention.

Figure 2:
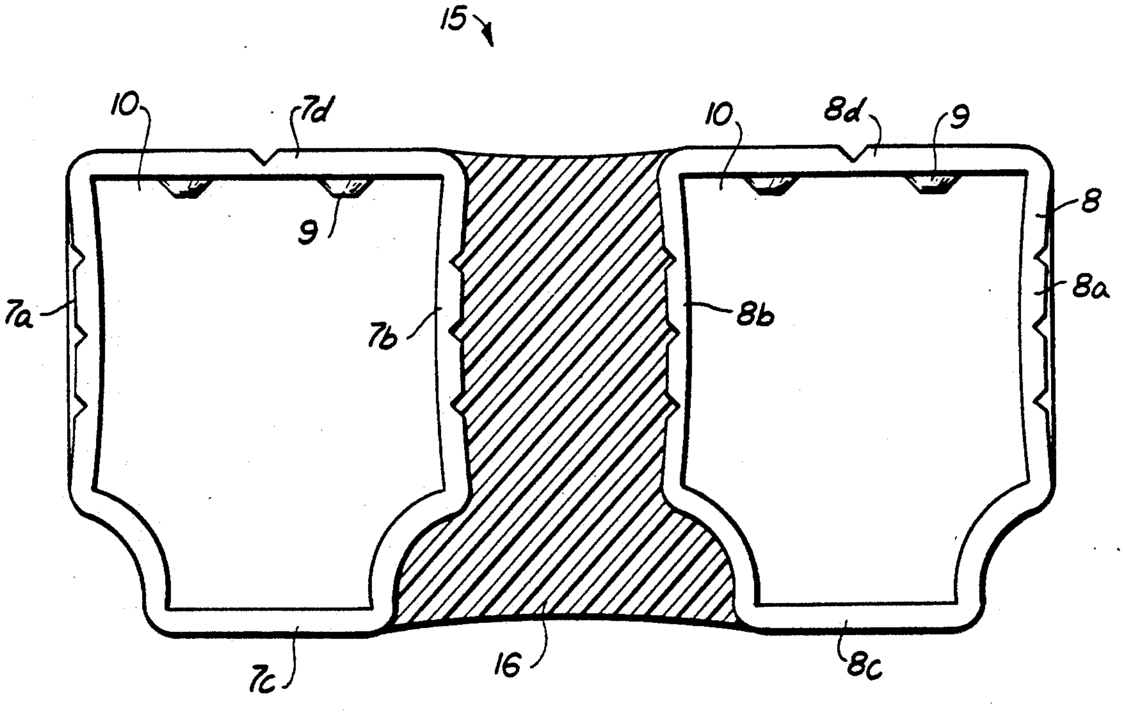
FIG. 2 shows a front view of a spacer.

A spacer 6 which is shown in front view in FIG. 2 and whose design is essential to this invention bridges the interspace 3.

Spacer 6 preferably consists of two parallel hollow aluminum sections 7 and 8 arranged side by side with some distance between them and with side walls 7*a*, 7*b* and 8*a*, 8*b* of a bottom wall 7*c*, 8*c* and a cover wall 7*d*, 8*d*, where the side walls are parallel to the surfaces of the panes of glass. Through-holes 9 are provided in the cover wall and create a connection—by a known method—between the interior 10 of hollow sections 7 and 8, which is filled with desiccant 11 and interspace 3. Preferably butyl 12 is provided in a known way between the walls 7*a* and 8*a* and the surfaces of panes of glass 1 and 2 facing the interior space. However, other bonding materials may also be provided there.

Space 13 beneath spacer 6 is preferably filled, e.g., with Thiokol 14.

It is essential that interspace 15 between the two hollow sections 7 and 8 is filled with a product that yields a hard substance that forms a permanent bond with aluminum or adheres strongly to aluminum and creates a uniformly strong spacer that has torsional rigidity and provides excellent electric insulation and also has an extremely low thermal conductivity. Furthermore, the product or the substance must also be resistant to UV light and heat. The proper substance has been found through an inventive selection.

According to this invention, a solid insulating web 16 that consists of an unfoamed, fully cured polyurethane casting compound is provided between hollow sections 7 and 8. The raw material for this insulating web 16 is marketed under the brand name Baydur VP PU 1397 of Bayer AG. It is a ready-to-use, low viscosity polyol formulation that contains a water-binding additive and has unstable phases. The blend must be homogenized well before processing. During processing, it should constantly be stirred slowly. The formulation has the following properties:

| | | |
|---|---|---|
| Hydroxyl value | (mg KOH/g) | 355 ± 20 |
| Water content | (%) | <0.20 |

-continued

| | | |
|---|---|---|
| Viscosity at 25° C. | (mPas) | 1200 ± 200 |
| pH | | about 11.5 |
| Density at 25° C. | (g/cm³) | about 1.05 |
| Flash point | (°C.) | 120° C. |
| Solidification range | (°C.) | −28 to −26° C. |

The lower limit of the processing temperature is 23° C. The activity of Baydur VP PU 1397 can be changed at temperatures above 35° C.

The processing temperature of the raw materials should be at least 23° C. At a characteristic value of 108, the following processing formulations are obtained:

100 parts by weight Baydur VP PU 1397
97 parts by weight Desmodur 44 V 10 B
or
97 parts by weight Desmodur 44 V 20 B The following processing characteristics were determined at a raw material temperature of 28° C. and are characteristic of the system:

| | | |
|---|---|---|
| Gelation time | (seconds): | 30 ± 10 |
| Mold temperature | (°C.) | 30–75 |
| Apparent density, cast in mold | (kg/m³) | 1180 |

For the proper mixture, e.g., at a processing temperature of 23° C. of the raw materials, 1000 kg Baydur VP PU 1397 are weighted with 970 kg Desmodur 44 V 10 B and stirred with a stirred at about 2000 rpm for 10 seconds. The setting time between the beginning of stirring and setting of the reaction mixture is 60±10 seconds. At the time of setting, the cast compound undergoes sudden solidification.

Baydur VP PU 1397 is a preparation based on polyols.

Insulation web 16 has the following properties, for example:

| | | | Baydur VP PU 1397/ Desmodur 44 V 10 B |
|---|---|---|---|
| Thickness of test specimen | | mm | 1010 |
| Apparent density | DIN 53432 | kg/m³ | 1170 |
| Flexural strength | DIN 53432 | MPa | 72 |
| Sagging at break | DIN 53432 | mm | 20 |
| Modulus of bending in flexure | | MPa | 1500 |
| Tensile strength | DIN 53432 | MPa | 47 |
| Tensile elongation | DIN 53432 | % | 21 |
| Impact strength | DIN 53432 | kJ/m² | 60 |
| Shore D hardness | DIN 53505 | | 74 |
| Behavior in heat under bending stress | DIN 53432 | °C. | 110 |

Processing shrinkage is only 0.8±0.1% of the manufacturing tolerance. This value is valid for production of an insulating web 13 up to 10 mm thick at an apparent density of 1180 kg/m³ when maintaining the processing formulation given above with Desmodur 44 V 10 B and a mold retention time of 1 minute in a mold tempered to 75° C.

Desmodur 44 V 10 B is a liquid solvent-free diphenylmethane 4,4′-diisocyanate containing a certain amount of isomers and higher functional homologs. It is used in combination with polyols to produce Baydur. As a rule, it has the following specifications on delivery:

| | |
|---|---|
| Isocyanate content | 31.5 wt % ± 1 wt % |
| Viscosity at 25° C. | 130 mPas ± 20 mPas |
| Acidity | max. 0.06 wt % |
| Total chlorine | max. 0.5 wt % |
| Phenyl isocyanate content | max. 50 ppm |

The technical properties are given below:

| | |
|---|---|
| Color | Brown |
| Density at 20° C. | 1.23 to 1.24 g/cm³ |
| Flash point | More than 200° C. |
| Vapor pressure (MDI) at room temperature | $<10^{-5}$ mbar |

Through the selection of this substance, it has been possible to create a spacer that is optimum for the purposes of this invention. The width of the solid insulation web 16 is preferably ⅓ to 1/6 the total width of the spacer.

When it is recalled that spacers made of plastics do not fulfill the long-term warranty requirements of the testing institutes and insulation glass manufacturers in combination with sealing substances, it can be regarded as surprising that the substance selected within the scope of this invention meets all the required standards with regard to the properties of insulation web 16. For example, it is possible to combine two 5.5 mm wide welded spacer sections 7 and 8, which are excellently suitable due to their great inherent stability and are made of the plastic selected according to this invention, to create the thermal and electric separation. Plastic angles can be used as the corner connectors in order to achieve optimum separation properties even in the corner area. In addition, however, it is also surprising that the new spacer section can be bent to an angle in the corner area without the plastic preventing such a bend.

The plastic selected according to this invention meets the following requirements:

Thermal stability >70° C. and >−35° C.
Good bonding properties with aluminum
Good bonding properties with the sealing substances needed for aluminum production
Resistance to gas diffusion
Separation of electric conductivity
Minimizing thermal diffusion Another good property of the polyurethane plastic selected here is that it can be combined permanently with the paints already developed for aluminum spacers so colored spacers can also be created. In particular, use of UV stabilized paints is possible.

Another especially important possibility is to pigment the polyurethane plastic and in this way create a decorative spacer.

Attempts to convert an extruded plastic section to a stable system that has torsional rigidity in combination with plastics have failed so far because of the low inherent stability as well as the danger of diffusion of the adhesives and also because of the complicated handling. In addition, there are the enormous production costs resulting from the complicated production method.

Use of two spacer sections in one pass with a liquid two-component polyurethane plastic leads to the production of an optimum spacer. Continuous synchronous application of the polyurethane between two parallel spacer sections and subsequent curing lead to a compact bond of the spacers which thus satisfy the conditions stipulated above. Thus a problem solution has been found that was not readily apparent.

Although thermal insulation values between 1.1 and 2.6 $W/m^2K$ have been reported for known heatable multilayer insulation glass and values between 2.83 and 2.88 $W/m^2K$ have been measured in tests on such safety glasses, it must be regarded as surprising that the multilayer insulation glass according to this invention assures values of about 0.45 $W/m^2K$, especially between 0.3 and 0.7 $W/m^2K$, for the heat transfer coefficient or the thermal insulation value. It is not yet known to what this extraordinarily great difference in values can be attributed.

Furthermore, the electric insulation effect of insulation web 16 is 100%.

I claim:

1. Heatable multilayer insulating glass comprising at least two panes of glass held a distance apart by means of a spacer with a gas-filled or evacuated interspace (3) between the panes and a resistance heating element on a glass surface facing the interspace and with connections for supplying an electric current to the resistance heating element, and wherein:

the spacer (6) comprises two parallel hollow sections (7, 8) arranged with some distance between them and having side walls (*7a, 7b* and *8a, 8b*) parallel to the glass surfaces, the mutually-facing surfaces (*7b, 8b*) defining an interspace (15) between the hollow sections;

a solid web (16) of an unfoamed and fully-cured polyurethane casting compound fills the interspace (15) between the two hollow sections (7, 8) and adheres well to the mutually-facing surfaces (*7b, 8b*) of the side walls of the hollow sections (7, 8); and the web is hard and forms a permanent bond with the hollow sections so that the hollow sections and hard web bonded thereto create a uniformly strong spacer having relatively high torsional rigidity and electrical insulation, and having relatively low thermal conductivity between the panes.

2. Multilayer insulating glass according to claim 1, characterized in that the hollow sections (7, 8) of the spacer (6) are filled with a desiccant (11).

3. Multilayer insulating glass according to claim 1, characterized in that a cement (12) is provided between the walls (*7a* and *8a*) and the surfaces of the panes of glass (1 and 2) facing the interspace.

4. Multilayer insulating glass according to claim 1, characterized in that a space (13) below the spacer (4) and the panes (1, 2) is filled with a cement compound.

5. Multilayer insulating glass according to claim 1, characterized in that the spacer hollow sections (7, 8) are made of metal.

6. Multilayer insulating glass according to claim 5, characterized in that the hollow sections (7, 8) are made of aluminum.

7. Multilayer insulating glass according to claim 5, characterized in that the hollow sections (7, 8) are made of steel.

8. Spacer especially for producing a heatable multilayer insulating glass characterized by at least two panes of glass held a distance apart by a spacer in an interspace (3) between the panes and a resistance heating element on a glass surface facing the interspace, the spacer (6) comprising:

two parallel hollow sections (7, 8) arranged with some distance between them and having side walls (*7a, 7b* and *8a, 8b*) parallel to the glass surfaces;

a solid web (16) of an unfoamed and fully-cured polyurethane casting compound filling the interspace (15) between the two hollow sections (7, 8) and adhering well to the mutually-facing surfaces (*7b, 8b*) of the side walls of the hollow sections (7, 8); and the web being hard and forming a permanent bond with the hollow sections so that the hollow sections and the hard web bonded thereto create a uniformly strong spacer having relatively high torsional rigidity and electrical insulation, and relatively low thermal conductivity across the side walls (*7b, 8b*).

9. Multilayer insulating glass comprising:

at least two panes of glass held a distance apart by means of a spacer with a gas-filled or evacuated interspace (3) between the panes;

the spacer (6) comprising two parallel hollow sections (7, 8) arranged with some distance between them and having side walls (*7a, 7b* and *8a, 8b*) parallel to the glass surfaces, the mutually-facing surfaces (*7b, 8b*) defining an interspace (15) between the hollow sections;

a solid web (16) of an unfoamed and fully-cured polyurethane casting compound filling the interspace (15) between the two hollow sections (7, 8) and adhering well to the mutually-facing surfaces (*7b, 8b*) of the side walls of the hollow sections (7, 8); and the web being hard and forming a permanent bond with the hollow sections so that the hollow sections and hard web bonded thereto create a uniformly strong spacer having relatively high torsional rigidity and electrical insulation, and having relatively low thermal conductivity between the panes.

10. Spacer for producing either an electrically heatable or a nonheatable multilayer insulating glass comprising at least two panes of glass held a distance apart by a spacer (6) in an interspace (3) between the panes, the spacer comprising:

two parallel hollow sections (7, 8) arranged with some distance between them and having side walls (*7a, 7b* and *8a, 8b*) parallel to the glass surfaces;

a solid web (16) of an unfoamed and fully-cured polyurethane casting compound filling the interspace (15) between the two hollow sections (7, 8) and adhering well to the mutually-facing surfaces (*7b, 8b*) of the side walls of the hollow sections (7, 8); and the web being hard and forming a permanent bond with the hollow sections so that the hollow sections and the hard web bonded thereto create a uniformly strong spacer having relatively high torsional rigidity and electrical insulation, and relatively low thermal conductivity across the side walls (*7b, 8b*).

* * * * *